No. 679,434. Patented July 30, 1901.
I. H. SISSON.
BUTTON ATTACHING MACHINE.
(Application filed Mar. 7, 1901.)
(No Model.)  6 Sheets—Sheet 1.

No. 679,434. Patented July 30, 1901.
I. H. SISSON.
BUTTON ATTACHING MACHINE.
(Application filed Mar. 7, 1901.)
(No Model.) 6 Sheets—Sheet 3.
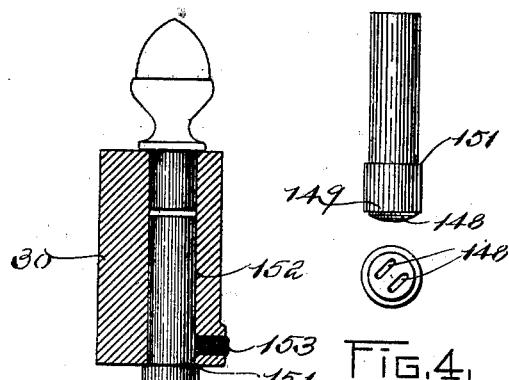
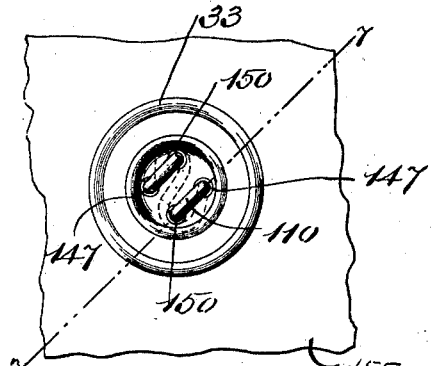
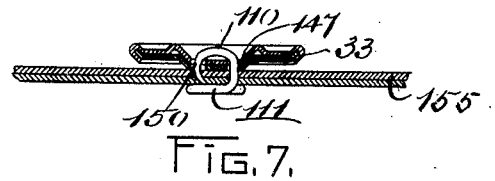
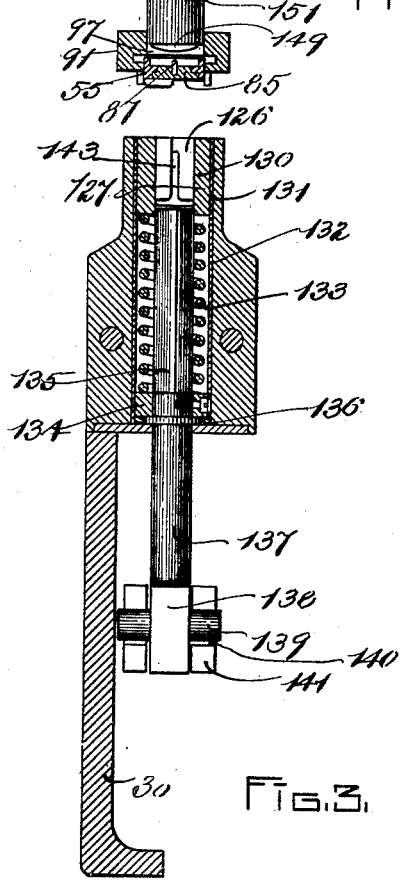

No. 679,434. Patented July 30, 1901.
I. H. SISSON.
BUTTON ATTACHING MACHINE.
(Application filed Mar. 7, 1901.)
(No Model.) 6 Sheets—Sheet 4.
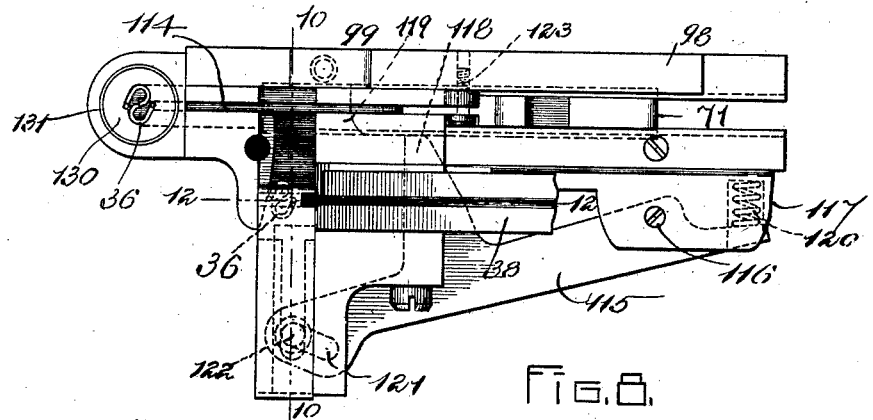
Fig. 8.
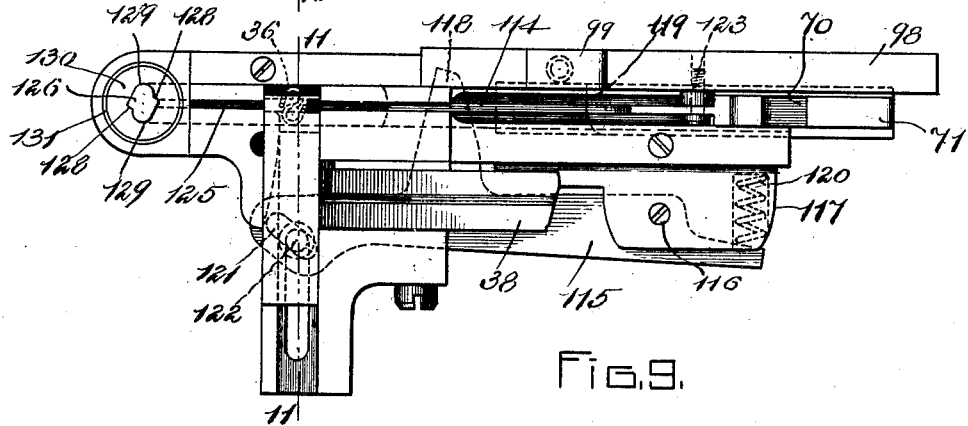
Fig. 9.
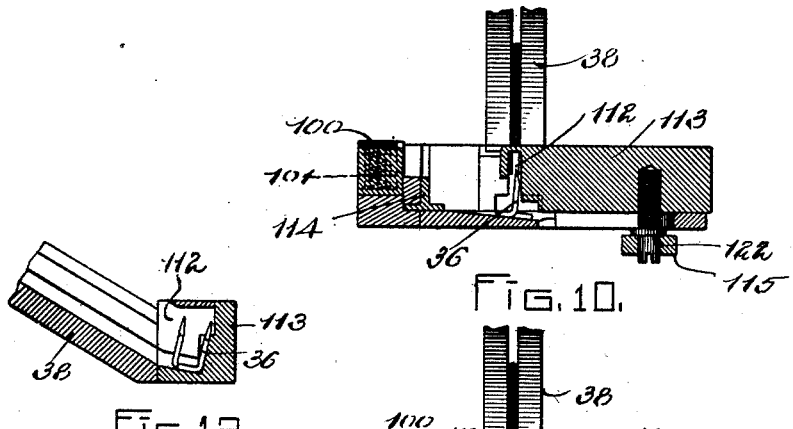
Fig. 10.
Fig. 12.
Fig. 11.
WITNESSES: INVENTOR:
James A. Jones. Isaac H. Sisson
George A. Tarbell. by his Attorney,
Charles S. Gooding
THE NORRIS PETERS CO., PHOTO-LITHO., WASHINGTON, D. C.

No. 679,434. Patented July 30, 1901.
I. H. SISSON.
BUTTON ATTACHING MACHINE.
(Application filed Mar. 7, 1901.)
(No Model.)
6 Sheets—Sheet 5.
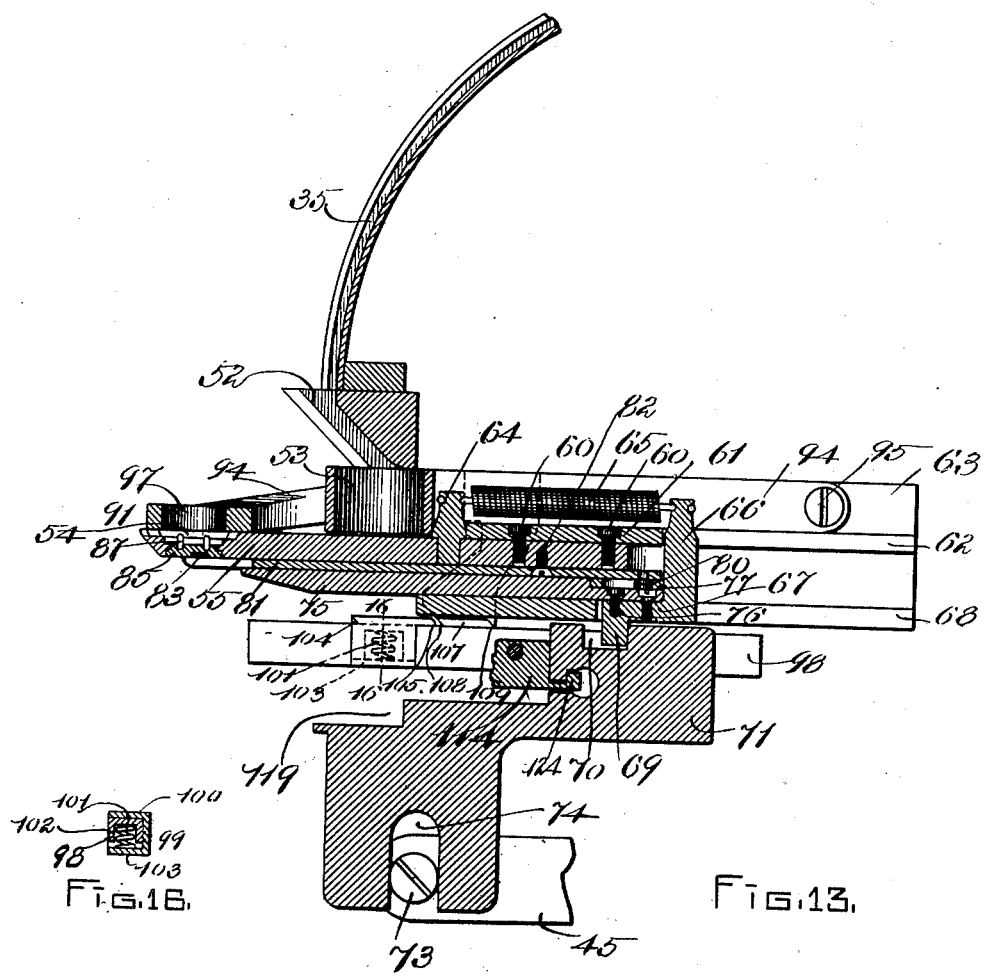
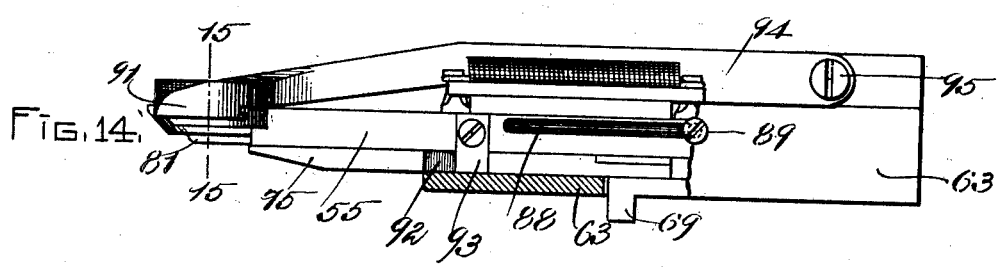
WITNESSES:
Louis C. Jones.
George A. Larkell.
INVENTOR:
Isaac H. Sisson
by his Attorney
Charles N. Gooding.

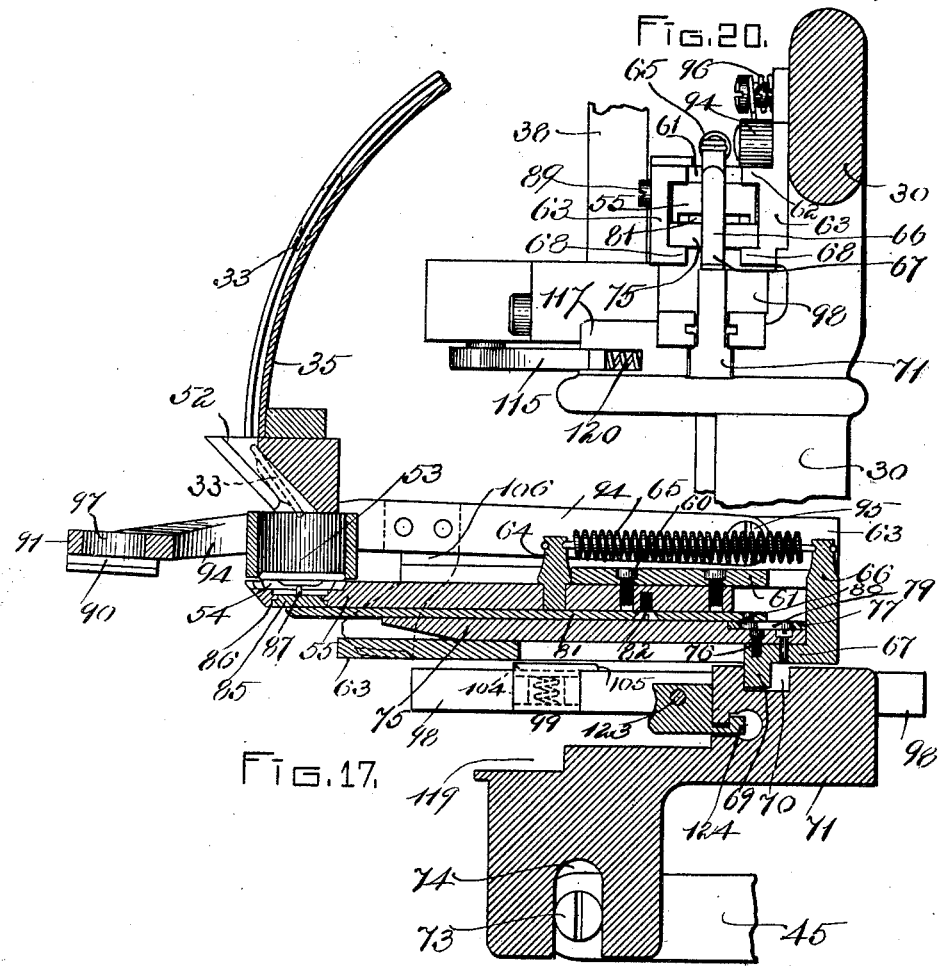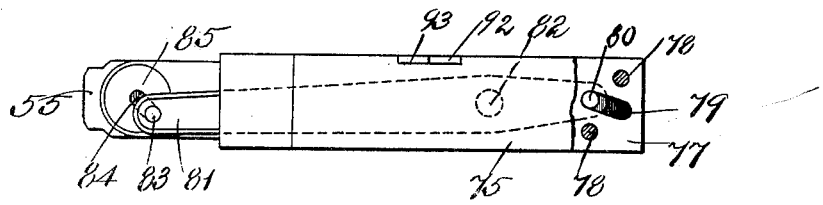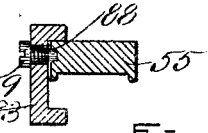

UNITED STATES PATENT OFFICE.

ISAAC H. SISSON, OF PROVIDENCE, RHODE ISLAND, ASSIGNOR TO ROBERT AMORY, OF BAR HARBOR, MAINE.

BUTTON-ATTACHING MACHINE.

SPECIFICATION forming part of Letters Patent No. 679,434, dated July 30, 1901.

Application filed March 7, 1901. Serial No. 50,174. (No model.)

*To all whom it may concern:*

Be it known that I, ISAAC H. SISSON, a citizen of the United States, residing at Providence, in the county of Providence and State of Rhode Island, have invented new and useful Improvements in Machines for Attaching Buttons to Clothing, of which the following is a specification.

This invention relates to machines for attaching buttons to garments or clothing by wire fasteners and is of the class of machines known as "foot-power" machines.

The invention consists in a rotary button-locator.

The invention again consists in a pivotally-supported button-holder.

The invention still further consists in a fastener-holder having a vertical guide-passage and a side passage leading from said vertical guide-passage to the outside of the holder, whereby a fastener may be introduced into the vertical guide-passage from the side of said fastener-holder.

The invention still further consists in the combination and arrangement of parts set forth in the following specification and particularly pointed out in the claims thereof.

Figure 1:
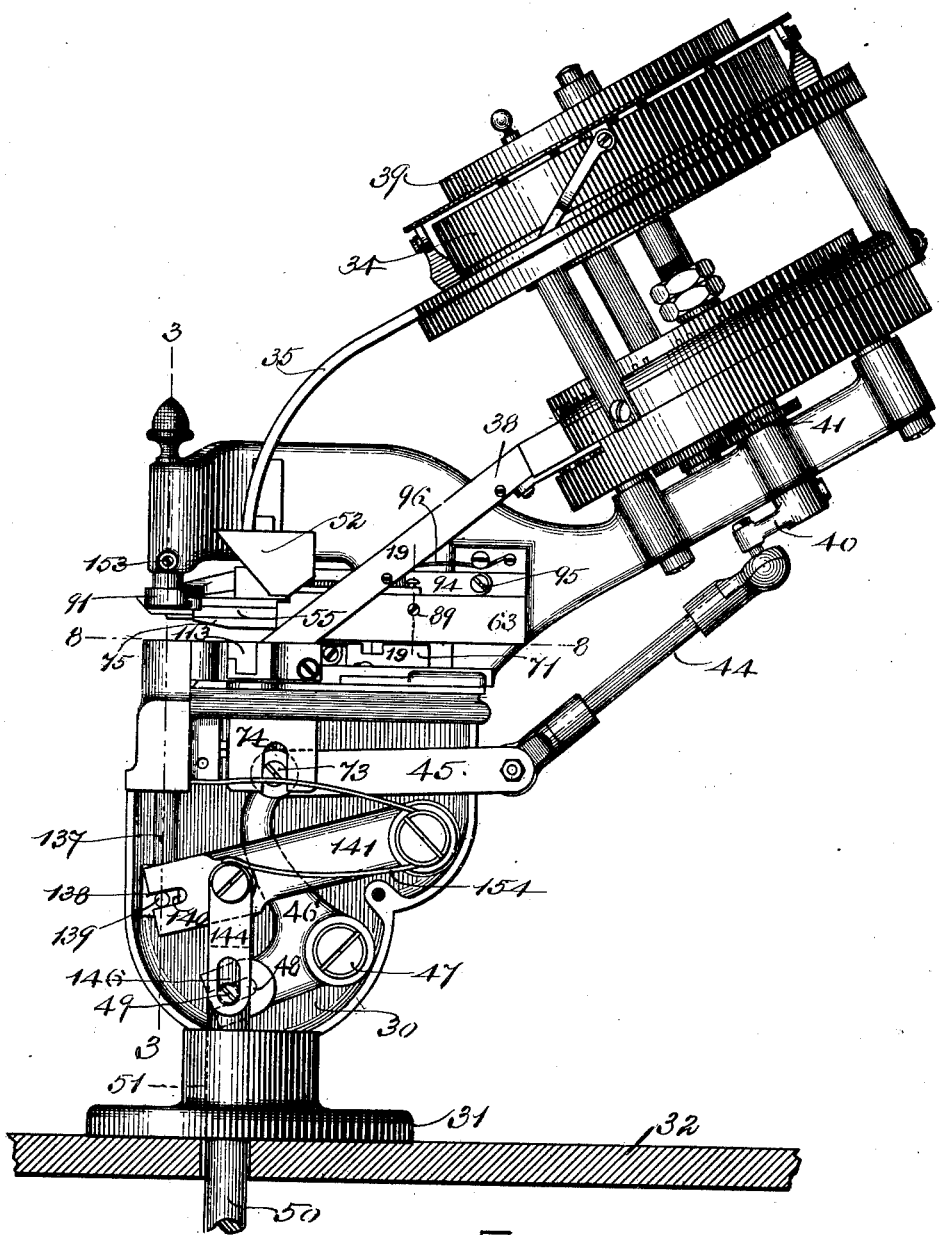
Figure 2:
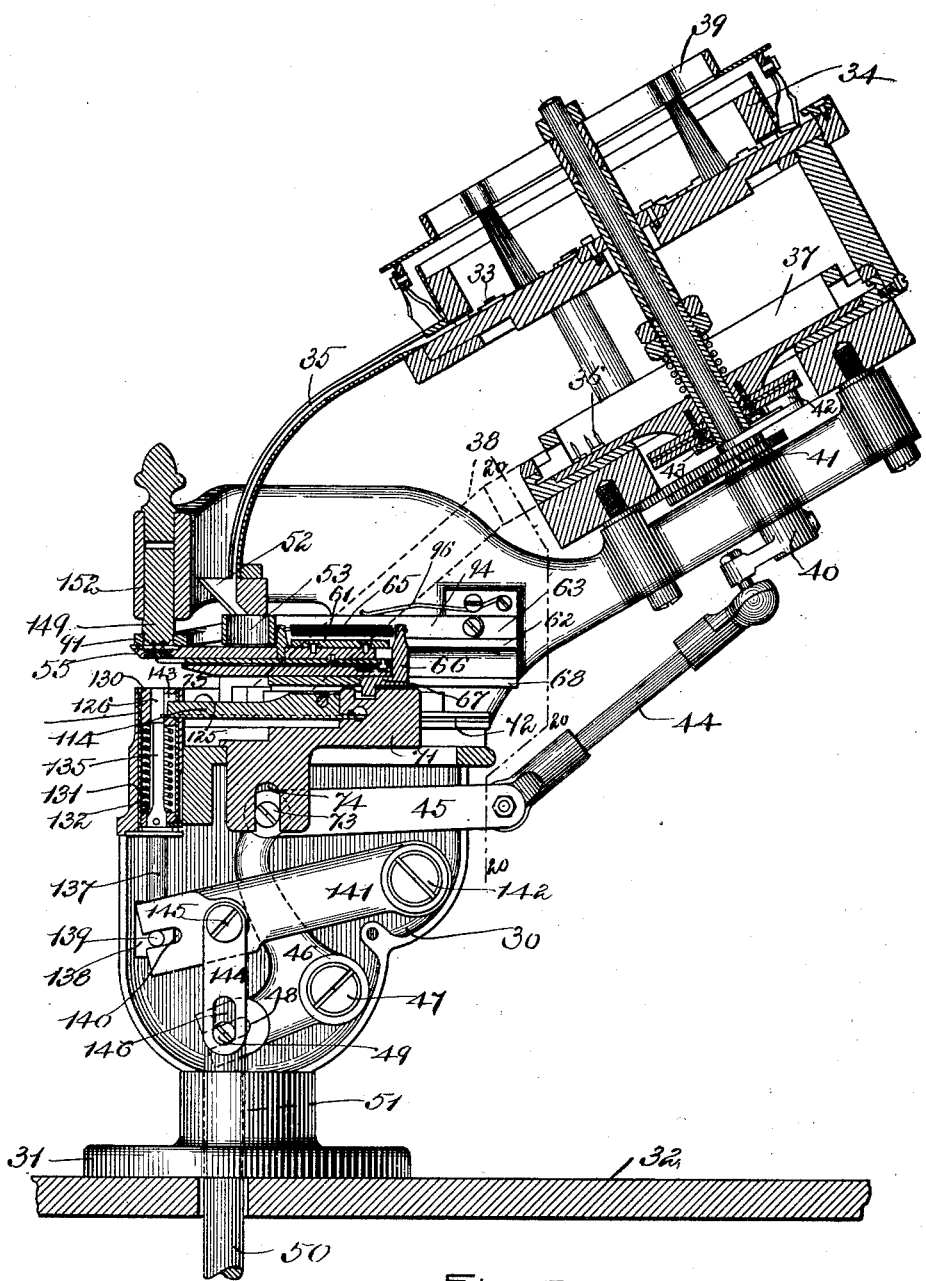

Referring to the drawings, Figure 1 is a side elevation of my improved button-attaching machine, showing the same attached to the top of a table, the treadle and connecting mechanism by means of which the machine is operated not being shown, any ordinary foot-treadle and spring for keeping said treadle raised of any desirable constructtion being used. Fig. 2 is a central longitudinal section of the same. Fig. 3 is a detail section, taken on line 3 3, Fig. 1, looking toward the right in said figure. Fig. 4 is a side elevation and underneath plan of the die by means of which the points of the fastener are turned over. Fig. 5 is a perspective view of the fastener by means of which the button is attached to the clothing. Fig. 6 is a top plan view of a button, showing the same attached by the fastener to a section of fabric. Fig. 7 is a section through the button and fabric, taken on line 7 7, Fig. 6. Fig. 8 is a detail top plan view of the fastener-feeding mechanism, taken below the line 8 8, Fig. 1, showing the parts in the same relative positions as in Fig. 1—viz., with the treadle raised. Fig. 9 is a view similar to Fig. 8, showing the parts in their relative positions when the treadle is lowered. Fig. 10 is a detail transverse section taken on line 10 10, Fig. 8, looking toward the right in said figure. Fig. 11 is a view similar to Fig. 10, taken on line 11 11, Fig. 9, looking toward the right in said figure. Fig. 12 is a detail section taken on line 12 12 of Fig. 8. Fig. 13 is a central longitudinal section, showing the button feeding and locating mechanism viewed in the same direction as Figs. 1 and 2 and showing the parts enlarged and in the same relative location to each other as in said Figs. 1 and 2. Fig. 14 is a side elevation of a portion of the button-feeding mechanism, a portion of the guide-plate being shown in section and broken away. Fig. 15 is a transverse section of the button-holding lever, taken on line 15 15 of Fig. 14. Fig. 16 is a transverse section taken on line 16 16, Fig. 13, showing the spring-latch by means of which the button-holding lever is tipped upon its pivot. Fig. 17 is a view similar to Fig. 13, showing the parts in their relative location when the treadle is depressed. Fig. 18 is an underneath plan of the button-locator-oscillating mechanism, the plate 75 being shown broken away. Fig. 19 is a detail section taken on line 19 19, Fig. 1. Fig. 20 is a sectional elevation taken on line 20 20, Fig. 2, looking toward the left in said figure and illustrating the button and fastener-feeding mechanisms.

Like numerals refer to like parts throughout the several views of the drawings.

In the drawings, 30 is the frame of the machine, having a base 31 integral therewith and fastened by screws to the top of a table or bench 32.

The buttons 33 are contained in a hopper 34 and are guided to the button feeding and locating mechanism along a raceway 35. The fasteners 36 are contained in a hopper 37 and are conducted to the fastener-carrying mechanism by a raceway 38. The hopper 37 and the brush-agitator 39 are given an intermittent rotation by means of a rocker-arm 40, gearing 41, pawl 42, and ratchet 43. The particular construction and operation of the hoppers 34 and 37 are not entered into in detail, as they form no essential part of this invention, any of the various styles of hoppers by means of which like articles are separated and delivered to a raceway being used for the purpose. The rocker-arm 40 is connected by a link 44 to another link 45, said link being pivotally connected to a bell-crank lever 46, pivoted at 47 to the frame 30 of the machine. The bell-crank lever 46 is slotted at 48 to engage a pin 49, fast to a vertical reciprocating treadle-rod 50. Said treadle-rod slides in a bearing 51 in the base 31 and is connected to the treadle on the opposite side of the pivot thereof from the foot end of said treadle, so that when the treadle is depressed the rod 50 is raised and the brush-agitator 39 and hopper 37 intermittently rotated through the connecting mechanism hereinbefore described.

The buttons 33 slide out of the hopper 34 face downward, Fig. 2, thence descending down the raceway 35, Fig. 17, as shown in dotted lines. The rim of the button passes out of said raceway into the backwardly-inclined guide 52, and the button slides down said guide into the vertical hollow cylindrical guide 53, whence it drops into a recess 54 in the upper face of the button-carrying slide 55. The carrier-slide 55 is attached by screws 60 to a horizontal plate 61, guided in ways 62 in the guide-plate 63. The carrier-slide 55 has a pin 64 fast thereto, said pin being connected by a spiral spring 65 to a post 66, integral with a slide 67, guided in ways 68 upon the guide-plate 63. The slide 67 has a lug 69 projecting downwardly therefrom into a slot 70, formed in the upper face of the main slide 71. The main slide 71 is guided in ways 72, fast to the frame of the machine, and has a reciprocating motion imparted thereto by a pin 73, which engages a vertical slot 74 in said slide 71. The pin 73 is fast to the upper end of the bell-crank lever 46, and as said bell-crank lever is rocked upon its pivot 47 by the treadle-rod 50 the slide 71 is carried backward and forward, carrying with it the slide 67 and the button-carrying slide 55. The plate 75 is fastened by screws 76 to the slide 67. Said plate has a hardened-steel slotted plate 77, fastened thereto by screws 78. The plate 77 has an inclined slot 79 extending therethrough and engaging a shouldered pin 80, fast to a lever 81, pivoted upon a screw 82, fast to the under side of the carrier-slide 55. Said lever has a pin 83 projecting upwardly from the forward end thereof and engaging a slot 84 in the oscillating button-locator 85. Said button-locator is free to rotate in a bearing 86, formed beneath the recess 54 and centrally located with reference to said recess. The button-locator 85 has two vertical pins 87 87 projecting upwardly therefrom and adapted to enter two holes in a button contained in the recess 54, as hereinbefore described.

It will be understood that the slide 67 and plate 75 are joined together to slide as one piece and that the slide 67 is joined to the carrier-slide 55 by a spiral spring 65, also that the lever 81 is pivoted upon the button-slide 55, so that when the slide 71 is carried to the right from the position shown in Fig. 13 to that shown in Fig. 17 said slide 67, plate 75, lever 81, carrier-slide 55, spiral spring 65, and the plate 61 all move together until the left-hand end of the slot 88 in the carrier-slide 55 abuts against the inner end of the stop-screw 89, which projects into said slot 88 and is supported by and screwed into the front face of the guide-plate 63. The carrier-slide 55 when the end of said slot 88 reaches the projecting end of the stop-pin 89 will stop in the position shown in Fig. 17, with the center of the button-locator 85 and of the recess for the button directly in line with the center of the cylindrical vertical guide 53. The plate 61 and rock-lever 81 stop with the slide 55; but the slide 67 and plate 75, together with the slotted plate 77, continue their motion toward the right, stretching the spiral spring 65 and rocking the lever 81 upon its pivot and also giving the button-locator a partial rotation until the parts are brought into the relative location shown in Fig. 18. It will thus be seen that the button-locator and the vertical pins thereon are given a partial rotation after the recess 54 and button-locator 85 are in line with the guide 53, said button-locator and button-carrier slide remaining stationary as to lengthwise or reciprocating movement during said partial rotation of said locator. This partial rotation of the button-locator is repeated when the slide 67 starts to return or move toward the left, Fig. 17, and during the herein-described rotation of the button-locator, both in the backward movement or toward the right, Fig. 13, of the slide 67 and in the movement toward the left of said slide, the plate 75 is allowed to move to the right from the position shown in Fig. 14 without carrying the slide 55 with it, by reason of the slot 92 in said plate 75, one end of said slot engaging a lug 93 upon the movement toward the left of the plate 75 and slide 67, so that while the button-locator is being rotated the button-carrier slide 55 remains stationary, and upon the return movement of the slide 67 and plate 75 said carrier-slide is carried positively to the left as soon as the right-hand end of the slot 92 abuts against the lug 93. This partial rotation of the button-locator 85 brings the pins 87 into line with the holes in the lowermost button, located in the vertical button-guide 53, and said lowermost button thereupon drops into the recess 54 in the carrier-slide 55. Upon the return movement of said carrier-slide the button, with the pins 87, located in diagonally opposite holes in said button, is carried forward to the position shown in Fig. 13, with the rim of the button 33 in the grooves 90, formed in the button-holder 91, Fig. 15.

The button-holder 91 consists of an arm 94, pivoted at 95 to the guide-plate 63, pressed downwardly against one of the ways 62 by a light spring 96. The forward end of said arm 94 has a cylindrical opening 97 therein, extending vertically therethrough, and the button-receiving grooves 90 90, located below said cylindrical opening and extending horizontally from right to left, Fig. 17, so that the button can be introduced into said grooves from the back, as hereinbefore described, and after the button is attached to the fabric 155 by the fastener, as hereinbefore described, said button can be removed from the holder by pulling the fabric and button toward the front or to the left, Fig. 13.

A plate 98, fast to the slide 71, has a spring-latch 99 attached thereto, Figs. 13, 16, and 17. Said spring-latch has a top plate 100, which rests upon the top of the plate 98 and is held against said plate by a spiral spring 101, contained in a recess 102 in the plate 98, said spring bearing against the bottom flange 103 upon the latch 99. The top plate 100 has the two ends thereof beveled off at 104 105. The arm 94 has a downwardly-projecting plate 106 fast thereto, having a flange 107 projecting horizontally from the lower end thereof, said flange having the ends 108 109 beveled.

The operation of the hereinbefore-described spring-latch upon the arm 94 is as follows: The button having been brought to the position herein described, with the rim resting in the grooves 90 in the button-holder 91, the slide 71 starts to move to the right upon the depression of the treadle. The plate 98 is carried with said slide, and the beveled face 105 of the top plate 100 engages the beveled end 108 of the flange 107 and raises said flange, thus tipping the arm 94 upon its pivot and raising the button 33 out of the button-carrier slide 55 and off of the pins 87. The carrier-slide after the button has been thus removed by the button-holder retreats, together with the slide 71, to receive a new button, and the button-holder retains the button in readiness for the setting operation.

The fasteners 36, by means of which the buttons are attached to the fabric, are preferably two-pronged, said prongs or legs 110 standing at right angles to an S-shaped head 111. The fasteners, as hereinbefore set forth, descend the raceway 38 from the hopper 37 and slide out of said raceway at the bottom thereof into a recess 112, formed in the left-hand end of the carrier-slide 113, Figs. 10, 11, and 12. The carrier-slide 113 is carried from the position shown in Fig. 10 to that shown in Fig. 11, pushing the fastener 36 ahead of it, as shown in said figures, and in line with a second fastener-slide 114. The slide 113 is given a reciprocating motion by a lever 115, pivoted at 116 to a projecting bracket 117, fast to the frame of the machine. The lever 115 has an arm 118 thereon, the end of which rests against the front edge of the slide 71, Fig. 8. When the slide 71 is drawn back, as hereinbefore described, to the position shown in Fig. 17, the arm 118 drops off said slide into the notch 119 thereon, being carried forward from the position shown in Fig. 8 by a spiral spring 120 to that shown in Fig. 9, the said spiral spring bearing against one end of said lever 115. The forward end of the lever 115 has an inclined slot 121 therein, which engages a stud 122, fast to the carrier-slide 113, Figs. 10 and 11. Upon the forward movement of the slide 71 from the position shown in Fig. 9 to that shown in Fig. 8 the arm 118 abuts against the end of the notch 119 on said slide 71 and is forced back against the spring 120 to the position shown in Fig. 8. The fastener 36 is next pushed by the fastener-slide 114 from the position shown in Fig. 9 to the position shown in Fig. 8. Said fastener-slide 114 is fast to the slide 71 by a screw 123 and lug 124. The fastener-slide 114 pushes the fastener 36 along the horizontal guide-passage 125 into the vertical guide-passage 126. Said vertical guide-passage 126 is formed in the fastener-holder 127 and conforms in cross-section or plan view to the contour of the S-shaped head of the fastener, having two vertical guide-walls 128, which join two semicircular arcs 129, located upon opposite sides of a center line.

The fastener-holder 127 consists of a cylindrical guide-block 130 for the fastener fast to a tube 131. Said tube 131 is formed to slide in a hole 132, drilled in the frame of the machine. A spiral spring 133 is contained within the tube 131, the upper end of said spring bearing against a guide-block 130 and the lower end of the same bearing against a collar 134, fast to a vertical reciprocating anvil 135. Said anvil is in horizontal cross-section of the same outline as the vertical guide-passage 126. The collar 134, fast to the anvil 135, engages upon its under side a flange 136, formed upon the tube 131. Said anvil is extended downwardly below the frame 30, Figs. 1, 2, and 3, and is of cylindrical shape at 137, terminating in a rectangular portion 138, having a cross-pin 139 fast thereto and engaging a slot 140 in an arm 141, pivoted at 142 to the frame of the machine.

It will be noted that the fastener 36 is carried into the guide-passage 126 in the fastener-holder through a side passage or opening 143 in said fastener-holder. When the treadle is depressed, the rod 50 forces the arm 141 upwardly by means of a link 144 fastened to said arm by a screw 145 and driven by a pin 49, which travels in a slot 146 in said link 144 until it arrives at the upper end of said slot, whereupon it imparts a rocking motion to the arm 141 through said link 144 and forces the anvil 135 upwardly, carrying the fastener 36, which at that time rests upon the upper end of the anvil in the guide-passage 126, and the fastener-holder, together with the spiral spring 133 and tube 131, upwardly, the button-carrier slide at the same time retreating out of its path and allowing the fabric to be carried by the fastener-holder upwardly against the under side of the button-holder, whereupon the fastener-holder comes to a rest. The prongs of the fastener are forced by the continued motion of the anvil (the spring 133 being compressed at that time) through two diagonally opposite holes 147 147 until they meet the grooves 148 148 in the under face of the die 149, whereupon the said prongs are turned over and back through the diagonally opposite holes 150 150 in said button 33 to return and clench upon the head of the fastener, as shown in Figs. 6 and 7. The die 149 is shouldered at 151, said shoulder bearing against the solid frame of the machine, and the shank 152 of said die is fitted to enter a hole in the frame of the machine, to which it is attached by set-screws 153. The spring 154, one end of which bears against the frame and the other against the link 144, serves to return the arm 141, link 144, and anvil-rod 137, together with the anvil 135 and fastener-holder 127, to the position in which said parts are shown in Fig. 2 after the treadle has been released.

The operation of the machine as a whole is as follows: Assuming the parts of the machine to be in the relative location shown in Figs. 1 and 2 and a button and fastener to have already been carried into position for attaching to the fabric, as hereinbefore described, the operator places the fabric upon the top face of the fastener-holder 127. He then depresses the treadle, raising the rod 50 and carrying the slide 71 toward the right in said figures, first raising the button-holder, with the button held in the grooves 90, and taking said button out of the recess 54 in the button-carrier slide 55 and disconnecting it from the pins 87. Upon the continued movement of the slide 71 to the right the arm 118 upon the lever 115 clears the slide 71 and drops off into the notch 119, being forced in the proper direction by the spring 120. This movement of the lever 115 carries the slide 113, together with the fastener 36, from the position shown in Fig. 8 to that shown in Fig. 9. The button-carrier slide 55 having retreated to a sufficient distance, the fastener-holder begins its ascent by virtue of the pin 49 having traveled the full length of the slot 146, and through the connecting mechanism between the link 144 and the button-holder said fastener-holder is raised, and simultaneously with the rising of said fastener-holder the button-holder is dropped to meet the goods and lay the button upon the surface thereof, said dropping of the button being effected by the spring-latch 99 clearing the flange 107 and allowing the button-holder to drop or be forced downwardly by the spring 96. Upon the continued downward movement of the treadle the fastener is forced out of the guide-passage and the prongs thereof are driven through the fabric and the holes in the button, as hereinbefore described. At the last end of the backward motion of the button-carrier slide the button-locator is given a quarter-turn in order to bring the pins 87 into line with the holes in the lowermost button of the vertical button-guide 53. The treadle is now released, the first motion being the quarter rotation of the button-locator. The button-carrier slide then starts forward with the button in the recessed portion 54, and the fastener-holder and button-holder descend together until the button-holder is in the position shown in Fig. 13, when it stops. The fastener-holder continues its downward motion and the button-carrying slide its forward motion, carrying a button into the button-holder, as hereinbefore described. During this forward motion of the button-carrying slide the fastener-slide 114 carries the fastener, previously brought into line therewith by the fastener-slide 113, out of the recess 112 in said fastener-slide along the horizontal guide-passage 125, through the side passage 143 in the fastener-holder 127, and into the vertical guide-passage 126, ready to be carried upwardly upon the next depression of the treadle. It will be seen that when the button-carrier slide is moving to the right, Fig. 13, the beveled edge 105 on the latch will abut against the beveled edge 108 on the flange 107 and raise the arm 94, and upon the return movement of the carrier-slide the beveled edge 104 on the latch 99 will abut against the beveled edge 109 on the flange 107, and in this case the spring 101 will yield and the flange 107 will pass under the top plate 100 of the latch without moving the arm 94 upon its pivot, so that when the carrier-slide starts to move to the right, Fig. 13, the button will be lifted from the recess in said slide by the arm 94, while upon the return movement of the carrier-slide 55 the button-holder and arm 94 will remain stationary, so that the button can pass into the grooves 90 in said button-holder.

Having thus described my invention, what I claim, and desire to secure by Letters Patent, is—

1. In a machine of the character described, a button-carrier slide, a recess therein to receive a button, a second slide in which said carrier-slide is arranged to reciprocate, a spring connecting said slides, and mechanism to impart a reciprocating motion to said slides.

2. In a machine of the character described, a button-carrier slide, a recess therein to receive a button, a second slide in which said carrier-slide is arranged to reciprocate, mechanism to impart a reciprocating motion to said slides, and mechanism to continue the reciprocating motion of one of said slides after the other reaches the limit of its reciprocating motion.

3. In a machine of the character described, a button-carrier slide, a recess therein to receive a button, a second slide in which said carrier-slide is arranged to reciprocate, a spring connecting said slides, mechanism to impart a reciprocating motion to said slides, and mechanism to continue the reciprocating motion of one of said slides after the other reaches the limit of its reciprocating motion.

4. In a machine of the character described, a button-carrier slide, a recess therein to receive a button, a rotary button-locator carried by said slide, and a lever pivoted to said carrier-slide and connected to said locator in such a manner as to impart a rotary motion to said locator when said lever is rocked upon its pivot, and means to rock said lever upon its pivot.

5. In a machine of the character described, a button-carrier slide, a recess therein to receive a button, a rotary button-locator, a lever pivoted to said carrier-slide and connected to said locator in such a manner as to impart a rotary motion to said locator when said lever is rocked upon its pivot, means to rock said lever upon its pivot, a second slide in which said carrier-slide is arranged to reciprocate, and mechanism to impart a reciprocating motion to said slides.

6. In a machine of the character described, a button-carrier slide, a recess therein to receive a button, a rotary button-locator, a lever pivoted to said carrier-slide and connected to said locator in such a manner as to impart a rotary motion to said locator when said lever is rocked upon its pivot, means to rock said lever upon its pivot, a second slide in which said carrier-slide is arranged to reciprocate, a spring connecting said slides, and mechanism to impart a reciprocating motion to said slides.

7. In a machine of the character described, a button-carrier slide, a recess therein to receive a button, a rotary button-locator, a lever pivoted to said carrier-slide and connected to said locator in such a manner as to impart a rotary motion to said locator when said lever is rocked upon its pivot, a second slide in which said carrier-slide is arranged to reciprocate, mechanism to impart a reciprocating motion to said slides, mechanism to continue the motion of said second slide after the carrier-slide has reached the limit of its movement, and means connecting said second slide and lever, whereby a rocking motion is imparted to said lever and a rotary motion to said locator.

8. In a machine of the character described, a button-carrier slide, a recess therein to receive a button, a rotary button-locator, a lever pivoted to said carrier-slide and connected to said locator in such a manner as to impart a rotary motion to said locator when said lever is rocked upon its pivot, a second slide in which said carrier-slide is arranged to reciprocate, a spring connecting said slides, mechanism to impart a reciprocating motion to said slides, mechanism to continue the motion of said second slide after the carrier-slide has reached the limit of its movement, and means connecting said second slide and lever, whereby a rocking motion is imparted to said lever and a rotary motion to said locator.

9. In a machine of the character described, a button-carrier slide, a recess therein to receive a button, a second slide in which said button-carrier slide is arranged to reciprocate, mechanism to impart a reciprocating motion to said slides in a horizontal plane, a button-holder pivoted to a stationary support and arranged to rock in a vertical plane, button-holding grooves in said button-holder adapted to receive the rim of a button held in said button-carrier slide, and mechanism to rock said button-holder upon its pivot and remove said button from said button-carrier slide.

10. In a machine of the character described, a button-carrier slide, a recess therein to receive a button, a second slide in which said button-carrier slide is arranged to reciprocate, mechanism to impart a reciprocating motion to said slides in a horizontal plane, a button-holder pivoted to a stationary support and arranged to rock in a vertical plane, button-holding grooves in said button-holder adapted to receive the rim of a button held in said button-carrier slide, and mechanism actuated by said second slide to rock said button-holder upon its pivot and remove said button from said button-carrier slide.

11. In a machine of the character described, a button-carrier slide, a recess therein to receive a button, a second slide in which said button-carrier slide is arranged to reciprocate, mechanism to impart a reciprocating motion to said slides in a horizontal plane, a button-locator carried by said button-carrier slide, mechanism to impart a rotary motion to said button-locator, a button-holder pivoted to a stationary support and arranged to rock in a vertical plane, button-holding grooves in said button-holder adapted to receive the rim of a button held in said button-carrier slide, and mechanism to rock said button-holder upon its pivot and remove said button from said button-carrier slide.

12. In a machine of the character described, a button-carrier slide, a recess therein to receive a button, a second slide in which said button-carrier slide is arranged to reciprocate, mechanism to impart a reciprocating motion to said slides in a horizontal plane, a clenching-die, a button-holder pivoted to a stationary support encircling said clenching-die and arranged to rock in a vertical plane, button-holding grooves in said button-holder adapted to receive the rim of a button held in said button-carrier slide, and mechanism to rock said button-holder upon its pivot, remove said button from said button-carrier slide, and hold it against the face of said die.

13. In a machine of the character described, a button-carrier slide, a recess therein to receive a button, a second slide in which said button-carrier slide is arranged to reciprocate, mechanism to impart a reciprocating motion to said slides in a horizontal plane, a clenching-die, a button-holder pivoted to a stationary support encircling said clenching-die and arranged to rock in a vertical plane, button-holding grooves in said button-holder adapted to receive the rim of a button held in said button-carrier slide, and mechanism to rock said button-holder upon its pivot, remove said button from said button-carrier slide, and hold it against the face of said die; in combination with a reciprocatory fastener-holder, a vertical guide-passage therein for a fastener, an anvil arranged to slide in said vertical guide-passage, and mechanism to impart a vertical reciprocatory motion to said anvil and force the legs of a fastener held in said guide-passage through the holes in said button and against said clenching-die.

In testimony whereof I have hereunto set my hand in presence of two subscribing witnesses.

ISAAC H. SISSON.

Witnesses:
GEORGE A. TARBELL,
ISAAC L. GOFF.